United States Patent [19]
Deckers et al.

[11] Patent Number: 5,880,233
[45] Date of Patent: Mar. 9, 1999

[54] PROCESS FOR THE PREPARATION OF ETHYLENE/(METH)ACRYLIC ACID COPOLYMERS

[75] Inventors: Andreas Deckers, Flomborn; Eckard Schauss, Heuchelheim; Roger Klimesch, Alsbach-Hähnlein; Wilhelm Weber, Neustadt, all of Germany

[73] Assignee: BASF Aktiengesellschaft, Ludwigshafen, Germany

[21] Appl. No.: 957,321

[22] Filed: Nov. 6, 1997

[51] Int. Cl.$^6$ ........................................................ C08F 4/38
[52] U.S. Cl. ........................ 526/228; 526/218; 526/318.25
[58] Field of Search ............................... 526/228, 318.25, 526/218

[56] References Cited

U.S. PATENT DOCUMENTS

| | | | |
|---|---|---|---|
| 3,865,881 | 2/1975 | McMullen | 260/593 |
| 4,351,931 | 9/1982 | Armitage . | |
| 4,698,450 | 10/1987 | Nuttens et al. | 585/520 |

FOREIGN PATENT DOCUMENTS

| | | |
|---|---|---|
| 17 229 | 10/1980 | European Pat. Off. . |

OTHER PUBLICATIONS

*Patent Abst. of Japan*, vol. 13, No. 408, C–634, Sep. 8, 1989 (English abstract of JP 1 149828A).

*Primary Examiner*—Bernard Lipman
*Assistant Examiner*—N. Sarafim
*Attorney, Agent, or Firm*—Keil & Weinkauf

[57] ABSTRACT

Copolymers of ethylene with $\alpha,\beta$-unsaturated carboxylic acids are prepared at from 50° to 250° C. and from 500 to 5000 bar in a stirred autoclave having a length/diameter ratio greater than 5:1 by a process in which the monomer mixtures are fed into the autoclave in at least two part-streams, the first part-stream being passed into the autoclave at the beginning of the autoclave pipe and the second part-stream being introduced at a position which is a distance away from the beginning which corresponds to 25–50% of the total length and the amount of the $\alpha,\beta$-unsaturated carboxylic acids in the first part-stream is from 20 to 90% less than the average amount in the further part-streams and a peroxide polymerization initiator having a lower decomposition temperature, or a mixture of peroxide polymerization initiators having a lower average decomposition temperature, than that of the initiators in the further part-streams is passed in with the first part-stream.

7 Claims, No Drawings

PROCESS FOR THE PREPARATION OF ETHYLENE/(METH)ACRYLIC ACID COPOLYMERS

The present invention relates to a process for the preparation of copolymers of ethylene with α,β-unsaturated carboxylic acids at from 50° to 250° C. and from 500 to 5000 bar in a stirred autoclave having a length/diameter ratio greater than 5:1.

The present invention furthermore relates to copolymers of ethylene with α,β-unsaturated carboxylic acids which are obtainable by the novel process and to the use of these copolymers in aqueous dispersions, as adhesion promoters and as adhesive raw material.

Copolymers of ethylene with α,β-unsaturated carboxylic acids, in particular with acrylic acid, have long been known (cf. Ullmanns Encyclopädie der technischen Chemie, 4th Edition, Volume 15, page 428). After partial neutralization with bases, such copolymers can be dispersed in water without the addition of emulsifiers. In order to obtain a gel particle-free dispersion in water, however, substantial homogeneity of the copolymer without extensive homopolymer regions of acrylic acid and ethylene is required. This homogeneity is not achieved in polymerizations in unstirred tube reactors, as described, for example in DE-A-42 19 129.

Copolymers of ethylene with α,β-unsaturated carboxylic acid which are prepared in stirred autoclaves usually have a lower level of inhomogeneity; however, the homogeneity of known copolymers of this type is still unsatisfactory.

U.S. Pat. No. 4,351,931 describes a copolymerization process in which the homogeneity is to be achieved by very high ethylene/carboxylic acid ratios. This process has a low space-time yield as by far the greatest part of the ethylene is not converted and must be recycled to the reactor.

EP-A-0 017 229 describes a copolymerization process in which the reaction temperature and the reaction pressure are established as a function of the process parameters required for obtaining a single-phase reaction mixture. However, this copolymerization process leads to copolymers which likewise cannot be dispersed in water in a manner such that no gel particles are present.

It is an object of the present invention to provide a process for the copolymerization of ethylene with α,β-unsaturated carboxylic acids which no longer has the disadvantages of the prior art and leads to copolymers which can be dispersed in water in a manner such that no gel particles are present.

We have found that this object is achieved by a process for the preparation of copolymers of ethylene with α,β-unsaturated carboxylic acids at from 50° to 250° C. and from 500 to 5000 bar in a stirred autoclave having a length/diameter ratio greater than 5:1, wherein the monomer mixtures are fed into the autoclave in at least two part-streams, the first part-stream being passed into the autoclave at the beginning of the autoclave pipe and the second part-stream being introduced at a position which is a distance away from the beginning which corresponds to 25–50% of the total length and the amount of the α,β-unsaturated carboxylic acids in the first part-stream is from 20 to 90% less than the average amount in the further part-streams and a peroxide polymerization initiator having a lower decomposition temperature, or a mixture of peroxide polymerization initiators having a lower average decomposition temperature, than that of the initiators in the further part-streams is passed in with the first part-stream.

We have also found novel copolymers which are obtainable by this process and the use of these copolymers in aqueous dispersions, as adhesion promoters and as adhesive raw material.

The α,β-unsaturated carboxylic acids which may be used in addition to ethylene as comonomers in the novel process are in general short-chain carboxylic acids of 3 to 8 carbon atoms. Examples are acrylic acid, methacrylic acid, crotonic acid, maleic acid and fumaric acid, as well as monoesters of these dicarboxylic acids, such as monomethyl maleate, monomethyl fumarate, monoethyl maleate and monoethyl fumarate, acrylic acid and methacrylic acid being particularly preferred comonomers.

The temperature and pressure conditions under which the novel process is carried out do not in general differ from those of known similar copolymerization processes. Thus, the pressure is from 500 to 5000, preferably from 1500 to 3000, bar. The reaction temperature is in general kept constant and the copolymers having the advantageous properties can be obtained without specific temperature gradients in the reactor. The reaction temperature is from 50° to 250° C., preferably from 150° to 250° C. Preheating the monomer mixtures to 50°–100° C., in particular 70°–100° C., before the polymerization zone has proven advantageous.

The stirred autoclaves to be used are pressure-resistant polymerization vessels which are equipped with a stirrer. These autoclaves must be equipped for a continuous process. Usually, these autoclaves are thermostatable, in particular for removing the resulting heat of polymerization during the polymerization phase.

According to the invention, the autoclaves have a length/diameter ratio greater than 5:1, in particular from 10:1 to 20:1, these dimensions each denoting the internal dimensions of the reactor. By means of this geometry, it is possible on the one hand to ensure sufficient thorough mixing of the monomers by stirring and, on the other hand, to establish a reaction profile along the longitudinal axis of the reactor. Of course, little copolymer is to be encountered in the first part and at the same time the carboxylic acid content in the monomer mixture is below average. At the end of the reactor, the degree of polymerization and at the same time the carboxylic acid content of the monomer mixture increase.

The formation of the reaction profile, in particular with regard to the comonomer contents and the initiator ratios, is achieved, according to the invention, by feeding in different comonomer mixtures and initiators at different points of the reactor. The process can be carried out most simply and nevertheless effectively by feeding the monomer mixtures in two part-streams into the autoclave.

The first part-stream is fed in as usual at the beginning of the reactor, ie. at the inlet end of the reactor. The carboxylic acid monomer content of this part-stream is 20–90% lower than the average content of the further part-streams or, in the simplest case, than that of the second part-stream. If, for example, the second part-stream contains 20 mol %, based on the total amount of the mixture, of carboxylic acid and ethylene, the first part-stream has a corresponding carboxylic acid monomer content of only from 2 to 16 mol %.

According to the invention, a second part-stream is passed into the autoclave at a position which is a distance away from the beginning which corresponds to 25–50%, preferably 30–45%, of the total length of the reactor. If further part-streams are passed into the reactor, they may advantageously be distributed over the length of the reactor, part-streams which are fed in after more than 60% of the total length generally no longer being sufficiently polymerized.

Good polymerization results and homogeneous copolymers are obtained in particular when the ethylene stream is distributed uniformly over the various part-streams. In the case of two part-streams, the ratio of the ethylene steams in these part-streams should be, for example, from 30:70 to 70:30, preferably from 40:60 to 60:40.

The carboxylic acid monomer content averaged over all part-streams is from 2 to 25, preferably from 5 to 15, mol %, based in each case on the total amount of carboxylic acid and ethylene.

In addition to the separate feeding of different comonomer mixture part-streams at different positions of the reactor, the object of good copolymer homogeneity is achieved by the use of different initiators or initiator mixtures in these part-streams. The peroxide initiators, which can undergo thermal decomposition into free radicals, are chosen so that the free radical formation in the first part-stream is greater than that in the second part-stream or in the further part-streams. A greater probability of activation of the more sluggish comonomer ethylene and hence the formation of a smaller amount of carboxylic acid homopolymer regions in the initial zone of the reactor are thus achieved. The increased free radical formation at the beginning of the reactor can be achieved either by means of an initiator having a lower decomposition temperature, or by means of a mixture of two or more initiators having a lower average decomposition temperature, than that of the initiators in the further part-streams.

In an advantageous embodiment of the novel process, mixtures of two peroxide polymerization initiators I and II are fed in with the part-streams, initiator I having a decomposition temperature of <140° C. and initiator II a decomposition temperature of >150° C. and the molar ratio of initiators I:II in the first part-stream being from 6:1 to 2:1 and that in the further part-streams being from 1:1 to 1:4.

Examples of suitable peroxide polymerization initiators I are tert-butyl peroxypivalate, tert-butyl peroxyisobutyrate, tert-butyl peroxy-2-ethylhexanoate, tert-butyl peroxydiethylacetate, tert-amyl peroxy-2-ethylhexanoate, 2,5-bis(2-ethyhexanoylperoxy)-2,5-dimethylhexane, bis(3, 5,5-trimethylhexanoyl) peroxide, tert-amyl peroxypivalate, tert-butyl peroxyneodecanoate, dibutyl peroxydicarbonate, bis(2-ethylhexyl) peroxydicarbonate, tert-amyl peroxyneodecanoate, 2,4,4-trimethylpent-2-yl peroxyneodecanoate, cumyl peroxyneodecanoate and diisobutanoyl peroxide, in addition to further ones having a similar decomposition temperature.

Examples of suitable peroxide polymerization initiators II are 1,1-bis(tert-butylperoxy) cyclohexane, 1,1-bis(tert-butylperoxy) butane, tert-butylperoxy-3,5,5-trimethylhexanoate, tert-butyl peroxyisopropylcarbonate, tert-butylperoxyacetate, tert-butyl peroxybenzoate, 2,5-bis (tert-butylperoxy)-2,5-dimethylhexane, tert-butyl cumyl peroxide, di-tert-butyl peroxide and 2,5-bis(tert-butylperoxy)-2,5-dimethyl-3-hexyne.

The decomposition temperature is defined as the temperature at which 50% of the molecules decompose into free radicals within one minute.

As in conventional processes for the copolymerization of ethylene with $\alpha,\beta$-unsaturated carboxylic acids, the molecular weight of the copolymers may be influenced by adding regulator substances. Suitable regulators are all conventional regulators, for example hydrocarbons, such as propane, propene and butene, ketones, such as acetone and methyl ethyl ketone, aldehydes, such as propionaldehyde, and hydrogen. Propionaldehyde, propene and butene are particularly suitable.

The copolymers obtainable by the novel process have noteworthy properties. For example, they have a pronounced uniform distribution of the carboxylic acid monomer units. As a result of this uniform distribution and the manageable amount of carboxylic acid or ethylene clusters, scarcely any crystalline regions occur. After partial neutralization, for example with ammonia or KOH, the copolymers can be dispersed in water in a manner such that no gel particles at all are present. These dispersions have excellent light transmittance. For these reasons, the use of the novel copolymers in aqueous dispersions is particularly advantageous.

The novel polymers generally have melt flow indices of from 0.1 to 50, in particular from 5 to 20, g/10 min, measured according to DIN 53 735 at 160° C. and 0.36 kp.

Owing to their alternate hydrophilic and hydrophobic regions, the novel copolymers are furthermore suitable as adhesion promoters, for example for coating steel pipes. The copolymers have excellent adhesion to metal surfaces. Metal surfaces coated with the copolymers can subsequently be particularly readily coated with finishes or plastics layers.

The novel copolymers are furthermore used for coating paper and for coating fertilizer granules. Such granules can be coated with the novel copolymers in a manner such that slow release of the fertilizer is achieved. Such slow-release forms of fertilizers often permit better utilization of the fertilizer and less washing out of the fertilizer into the ground water.

EXAMPLES

General method for the preparation of the copolymers

The copolymerizations were carried out in a 35 l steel autoclave having a length/diameter ratio of 15. The comonomer mixtures were introduced in two part-streams, at the beginning of the autoclave and after 45% of the autoclave length, measured from the beginning. The ethylene stream was identical in the part-streams (total ethylene throughput 1400 kg/h), and the acrylic acid contents and the peroxide initiator ratios were varied. tert-Butyl peroxy pivalate was used as peroxide I and Tert-butyl peroxy-3,5,5-trimethylhexanoate as peroxide II. Acrylic acid was metered in the desired amounts into ethylene, which had been compressed beforehand to 230 bar, and the mixture was compressed to a final pressure of 2300 bar in separate compressors. All part-streams also contained 1000 ppm of propionaldehyde. The mixtures were preheated to 100° C. and fed into the reactor. Directly at the reactor inlets, the initiator mixtures were added in the molar ratios stated in the table. By cooling the autoclave with hot water, the reaction temperature was kept at 230° C. After passing through the autoclave, the reaction mixture was let down in two stages and discharged with the aid of an extruder. Any unconverted ethylene was recycled to the process.

The results are shown in the table below.

| | 1st part-stream | | | 2nd part-stream | | | Light transmittance [%][5] |
|---|---|---|---|---|---|---|---|
| Ex. | I/II[1] | ppm (I + II)[2] | AA %[3] | I/II[1] | ppm (I + II)[2] | AA %[3] | |
| 1 | 4:1 | 40 | 3 | 1:1 | 30 | 7 | 85 |
| 2 | 4:1 | 40 | 3 | 1:3 | 30 | 7 | 81 |
| 3 | 4:1 | 35 | 4 | 1:1 | 39 | 6 | 79 |
| V[4] | 4:1 | 32 | 5 | 1:1 | 37 | 5 | 21 |

[1] Molar ratio of the peroxide initiators I and II.
[2] Total concentration of the peroxide initiators I and II.
[3] Mol % of acrylic acid, based on the total amount of acrylic acid and ethylene.
[4] Comparative example not according to the invention, same AA content in both part-streams.

We claim:

1. Process for the preparation of copolymers of ethylene with $\alpha,\beta$-unsaturated carboxylic acids at from 50° to 250° C. and from 500 to 5000 bar in a stirred autoclave having a length/diameter ratio greater than 5:1, wherein the monomer mixtures are fed into tie autoclave in at least two part-streams, the first part-stream being passed into the autoclave at the beginning of the autoclave pipe and the second part-stream being introduced at a position which is a distance away from the beginning which corresponds to 25–50% of the total length and the amount of the $\alpha,\beta$-unsaturated carboxylic acids in the first part-stream is from 20 to 90% less than the average amount in the further part-streams and a peroxide polymerization initiator having a lower decomposition temperature, or a mixture of peroxide polymerization initiators having a lower average decomposition temperature, than that of the initiators in the further part-streams is passed in with the first part-stream.

2. A process as set forth in claim 1, wherein the reaction is carried out at from 1500 to 3000 bar.

3. A process as set forth in claim 1, wherein the reaction is carried out at from 150° to 250° C.

4. A process as set forth in any of claim 1, wherein the reaction is carried out in an autoclave having a length/diameter ratio of from 10:1 to 20:1.

5. A process as set forth in any of claim 1, wherein the monomer mixtures are fed into the autoclave in two part-streams.

6. A process as set forth in any of claim 1, wherein mixtures of two peroxide polymerization initiators I and II are fed in with the part-streams, initiator I having a decomposition temperature of <140° C. and initiator II a decomposition temperature >150° C. and the molar ratio of the initiators I:II in the first part-stream being from 6:1 to 2:1 and that in the further part-streams being from 1:1 to 1:4.

7. A process as set forth in any of claim 1, wherein the $\alpha,\beta$-unsaturated carboxylic acid used is acrylic acid or methacrylic acid.

* * * * *

UNITED STATES PATENT AND TRADEMARK OFFICE
CERTIFICATE OF CORRECTION

PATENT NO.: 5,880,233

DATED: March 9, 1999

INVENTOR(S): DECKERS et al.

It is certified that error appears in the above-identified patent and that said Letters Patent is hereby corrected as shown below:

Col. 4, claim 1, line 61, "tie" should be --the--.

Signed and Sealed this

Twentieth Day of July, 1999

Attest:

Q. TODD DICKINSON

Attesting Officer

Acting Commissioner of Patents and Trademarks